United States Patent
Bynum (10) Patent No.: US 9,828,184 B1
(45) Date of Patent: Nov. 28, 2017

(54) PORTABLE MULTI-SECTIONED BOOM CONCRETE CONVEYOR ASSEMBLY

(71) Applicant: Next Era Belting, Inc., Palm City, FL (US)

(72) Inventor: Walter Bynum, Palm City, FL (US)

(73) Assignee: Next Era Belting, Inc., Palm City, FL (US)

( * ) Notice: Subject to any disclaimer, the term of this patent is extended or adjusted under 35 U.S.C. 154(b) by 0 days.

(21) Appl. No.: 15/380,599

(22) Filed: Dec. 15, 2016

(51) Int. Cl.
| | |
|---|---|
| *B65G 21/00* | (2006.01) |
| *B65G 21/10* | (2006.01) |
| *B65G 41/00* | (2006.01) |
| *B65G 47/72* | (2006.01) |
| *B65G 21/12* | (2006.01) |
| *B65G 15/24* | (2006.01) |
| *B65G 11/02* | (2006.01) |

(52) U.S. Cl.
CPC ............ *B65G 21/12* (2013.01); *B65G 11/026* (2013.01); *B65G 15/24* (2013.01)

(58) Field of Classification Search
None
See application file for complete search history.

(56) References Cited

U.S. PATENT DOCUMENTS

| | | | | |
|---|---|---|---|---|
| 5,634,545 A * | 6/1997 | Plumley | ................ | B65G 37/00 198/303 |
| 2013/0118862 A1* | 5/2013 | Stewart | ................ | B65G 21/12 198/300 |

* cited by examiner

*Primary Examiner* — Kavel Singh
(74) *Attorney, Agent, or Firm* — The Concept Law Group, P.A.; Scott D. Smiley

(57) ABSTRACT

A portable multi-sectioned boom concrete conveyor assembly that includes a feeder conveyor configured to transport a construction material toward a distal end of the feeder conveyor and a main conveyor boom assembly including a plurality of main conveyor boom sections. The plurality of main conveyor boom sections may include a proximal main conveyor boom section and a distal main conveyor boom section that is rotatably coupled to one of the plurality of main conveyor boom sections about a revolution joint, has a second main conveyor belt spanning from a first end of the distal main conveyor boom section to a second end of the distal main conveyor boom section, and is operably configured to independently revolve approximately 360° about the revolution joint. The first and second main conveyor belts are operably configured to transport the construction material toward the second end of the distal main conveyor boom section.

20 Claims, 8 Drawing Sheets

PORTABLE MULTI-SECTIONED BOOM CONCRETE CONVEYOR ASSEMBLY

FIELD OF THE INVENTION

The present invention relates generally to portable assemblies used to convey construction material such as concrete to a placement location, and, more particularly, relates to vehicles having a multi-sectioned boom with a conveyor used to transport concrete or other construction materials to the placement location.

BACKGROUND OF THE INVENTION

One essential aspect of construction is concrete and other construction material (referred to generally as "concrete"), which is employed in the construction of buildings, parking garages, and other structures. Typically, concrete is transported by, for example, a concrete mixing truck to a construction site where it is pumped to a placement or installation location. Alternatively, concrete may also be mixed at the construction site and pumped to the placement location.

To convey the concrete to the placement location while at a construction site, some known assemblies, such as those commercially sold by the company, Putzmeister, utilize a trailer or truck having multiple extendable and articulating boom sections acting as a frame for a conduit or piping carrying the concrete to a placement location. These multiple extendable boom sections are sometimes referred to as a "main conveyor." To get the concrete to the main conveyor, these assemblies utilize a pumping system to transport the concrete to the placement location. These boom sections are pivotally coupled with respect to one another and are operable to have a single degree of freedom with respect to a single joint in which two individual boom sections are coupled. Over the length of the main conveyor, the multiple boom sections combine to have multiple degrees of freedom, yet they are still problematically limited to a single access of movement, i.e., vertically, with respect to one another. As such, to navigate to the main conveyor horizontally the entire main conveyor is required to be rotated with respect to the base of main conveyor and the trailer (hereinafter "main conveyor base joint"). This presents multiple problems to users having concrete placement locations within tight and/or compact confines and/or construction sites where power and/or telephone lines are present. Readjusting the length or position of the main conveyor, whether it be by horizontal movement about the main conveyor base joint or by pivoting individual boom sections with respect to one another, can also be a cost-, time-, and/or labor-intensive endeavor.

These above-described conduit-based pumping systems are also problematic in that they are not as compact as telescopic main conveyors utilizing belt conveyors, such as those commercially marketed by Putzmetizer under the trademark Telebelt TB 600 and as described in U.S. Pat. Nos. 4,624,357, 6,431,346, 8,662,291 (wherein the entirety of said descriptions are incorporated herein by reference). Moreover, those conduit-based pumping systems are also problematic in that they generally require more power to operate and, should the pump break and/or malfunction, also typically require the entire conduit to be replaced. Furthermore, there are significant safety issues associated with pumping systems as they can become over-pressurized, fail, and generate condition called "hose whip."

Many of the known belt conveyors also present problems to users because they too require rotation of the main conveyor at the main conveyor base joint to place and/or deliver the concrete to the user and/or maneuver the end hose attached to the distal end of the main conveyor. Moreover, those known telescopic belt conveyors telescope the main conveyor by extending and retracting a plurality of boom sections within one another. Therefore, vertical adjustment of one or more of the main boom sections is unavailable unless the user vertically adjusts the main conveyor about the main conveyor base joint, which can cost- and time-intensive.

Therefore, a need exists to overcome the problems with the prior art as discussed above.

SUMMARY OF THE INVENTION

With the foregoing and other objects in view, there is provided, in accordance with the invention, a portable multi-sectioned boom concrete conveyor assembly with a feeder conveyor having a belt operably configured to transport a construction material toward a distal end of the feeder conveyor and a main conveyor boom assembly including a plurality of main conveyor boom sections. In one embodiment, the plurality of main conveyor boom sections have a proximal main conveyor boom section with a first main conveyor belt and a first end rotatably coupled to a deck of a vehicle about a main conveyor base joint and a distal main conveyor boom section that is rotatably coupled to one of the plurality of main conveyor boom sections about a revolution joint, has a second main conveyor belt spanning from a first end of the distal main conveyor boom section to a second end of the distal main conveyor boom section, and is operably configured to independently revolve approximately 360° about the revolution joint. The first and second main conveyor belts are then operably configured to transport the construction material toward the second end of the distal main conveyor boom section and ultimately to the concrete placement location.

In accordance with another feature, an embodiment of the present invention includes the plurality of main conveyor boom sections having an intermediate main conveyor boom section with a first end translatably coupled to the proximal main conveyor boom section, wherein the distal main conveyor boom section is rotatably and directly coupled to the intermediate main conveyor boom section about the revolution joint.

In accordance with a further feature of the present invention, the revolution joint is disposed at the first end of the distal main conveyor boom section.

In accordance with a further feature of the present invention, the assembly includes a belt plane defined by the first main conveyor belt while disposed on an upper surface of the intermediate main conveyor boom section and an axis of revolution defined by a center of rotation of the distal main conveyor boom section about the revolution joint, wherein the axis of revolution disposed at an approximately orthogonal orientation with respect to the belt plane.

In accordance with yet another feature of the present invention, the assembly also includes the plurality of main conveyor boom sections having a second intermediate main conveyor boom section with a first end pivotally and directly coupled to the proximal main conveyor boom section and a second end translatably coupled to the intermediate main conveyor boom section, wherein the second intermediate main conveyor boom section interposed between the intermediate main conveyor boom section and the proximal main conveyor boom section.

In accordance with a further feature of the present invention, the first main conveyor belt spans from the from the first end of the proximal main conveyor boom section to a second end of the intermediate main conveyor boom section, wherein the first main conveyor belt is operably configured to revolve around the proximal main conveyor boom section, the intermediate main conveyor boom section, and the second intermediate main conveyor boom section.

In accordance with another feature, an embodiment of the present invention includes a deck pivot joint disposed at a distal end of the deck of the vehicle, wherein the feeder conveyor it pivotably coupled to the deck pivot joint.

In accordance with yet another feature, an embodiment of the present invention also includes the feeder conveyor having a hopper coupled to a proximal end of the feeder conveyor, wherein the feeder conveyor is operably configured to transport the construction material from the hopper toward the distal end of the feeder conveyor.

In accordance with an additional feature, an embodiment of the present invention also includes an operational position along a feeder conveyor placement path, wherein the operational position includes the distal end of the feeder conveyor in a superimposed configuration with respect to the first end of the proximal main conveyor boom section and the first main conveyor belt.

In accordance with the present invention, a portable multi-sectioned boom concrete conveyor assembly is also disclosed that includes a main conveyor boom assembly having a plurality of main conveyor boom sections, wherein the plurality of main conveyor boom sections have a proximal main conveyor boom section with a first main conveyor belt revolvably coupled thereto and a first end rotatably coupled to a deck of a vehicle about a main conveyor base joint, an intermediate main conveyor boom section translatably coupled to the proximal main conveyor boom section and having the first main conveyor belt revolvably coupled thereto, and a distal main conveyor boom section. The distal main conveyor boom section may be rotatably coupled to the intermediate main conveyor boom section about a revolution joint disposed at a first end of the distal main conveyor boom section, may have a second main conveyor belt, independent of the first main conveyor belt, revolvably coupled thereto and spanning from the first end of the distal main conveyor boom section to a second end of the distal main conveyor boom section, and may be operably configured to independently revolve approximately 360° about the revolution joint, wherein the first and second main conveyor belts are operably configured to transport a construction material toward the second end of the distal main conveyor boom section.

In accordance with yet another feature, an embodiment of the present invention includes a feeder conveyor with a belt operably configured to transport the construction material toward a distal end of the feeder conveyor.

In accordance with an additional feature, an embodiment of the present invention also includes a deck pivot joint disposed at a distal end of the deck of the vehicle, wherein the feeder conveyor it pivotably coupled to the deck pivot joint. The feeder conveyor may have a hopper coupled to a proximal end of the feeder conveyor, wherein the feeder conveyor is operably configured to transport the construction material from the hopper toward the distal end of the feeder conveyor.

In accordance with yet another feature, an embodiment of the present invention also includes the feeder conveyor having an operational position along a feeder conveyor placement path, wherein the operational position includes the distal end of the feeder conveyor in a superimposed configuration with respect to the first end of the proximal main conveyor boom section and the first main conveyor belt.

In accordance with an exemplary feature, an embodiment of the present invention also includes a belt plane defined by the first main conveyor belt while disposed on an upper surface of the intermediate main conveyor boom section and an axis of revolution defined by a center of rotation of the distal main conveyor boom section about the revolution joint, wherein the axis of revolution is disposed at an approximately orthogonal orientation with respect to the belt plane.

Also in accordance with the present invention, a portable multi-sectioned boom concrete conveyor assembly is disclosed that includes a main conveyor boom assembly including a plurality of main conveyor boom sections, wherein the plurality of main conveyor boom sections have a proximal main conveyor boom section with a first main conveyor belt revolvably coupled thereto and a first end rotatably coupled to a deck of a vehicle about a main conveyor base joint, a mechanical driver mechanically coupled to a second end of the proximal main conveyor boom section, and an intermediate main conveyor boom section directly and pivotably coupled to a second end of the proximal main conveyor boom section about a pivot joint and having the first main conveyor belt revolvably coupled thereto, wherein the intermediate main conveyor boom section is operably configured, through the mechanical driver, to rotatably and vertically pivot with respect to the second end of the proximal main conveyor boom section.

The invention provides a portable multi-sectioned boom concrete conveyor assembly employing a belt conveyor that overcomes the hereinafore-mentioned disadvantages of the heretofore-known devices and methods of this general type. Specifically, said conveyor assembly can beneficially revolve its distal boom section and provide users quick and effective adjustability and storage of each individual boom section and the feeder section of the assembly. Although the invention is illustrated and described herein as embodied in a portable multi-sectioned boom concrete conveyor assembly, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

In accordance with another feature, the intermediate main conveyor boom section is operably configured, through the mechanical driver, to rotatably and vertically pivot with respect to the second end of the proximal main conveyor boom section a negative angular deviation of at least 25° relative to a planar axis defined by the generally longitudinal orientation of the proximal main conveyor boom section. The proximal main conveyor boom section may also taper in thickness as it spans towards the second end of the proximal main conveyor boom section.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the main conveyor.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention. The assembly and components depicted within the figures are not (unless otherwise expressly identified) to scale.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

Figure 1:
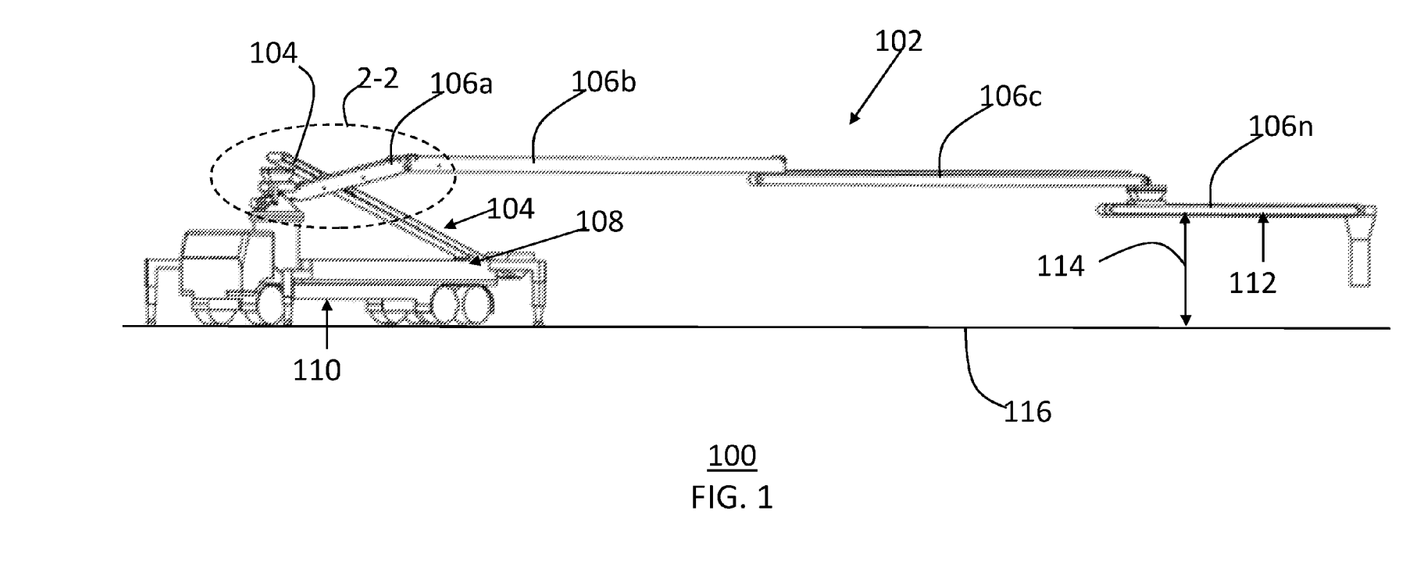
FIG. 1 is an elevational side view of a portable multi-sectioned boom concrete conveyor assembly in an extended position along a boom extension path in accordance with one embodiment of the present invention.

The present invention provides a novel and efficient portable multi-sectioned boom concrete conveyor assembly 100 generally having a main conveyor boom assembly 102 and a feeder conveyor 104, as depicted in FIG. 1 illustrating one embodiment of the present invention. FIG. 1 shows several advantageous features of the present invention, but, as will be described below, the invention can be provided in several shapes, sizes, combinations of features and components, and varying numbers and functions of the components. The assembly 100 is portable in that it can be transported from location to location on a vehicle, such as a motorized truck or a trailer for easy placement of a construction material, such as concrete. Beneficially, a plurality of main boom sections 106a-n (wherein the letter "n" represents any number greater than 1) of the main conveyor boom assembly 102 are operable to extend, retract, and vertically adjust with respect to one another. In one embodiment, this retraction and extension is telescopic translation, as depicted in the figures, and as previous known by those of skill in the art—as discussed in references cited in the Background. Moreover, a distal main conveyor boom section (reflected as 106n in FIG. 1) is also beneficially operable to revolve with respect to an adjacent main boom section coupled thereto. As such, the concrete conveyor assembly 100 has more effective and efficient maneuverability than those known assemblies.

Figure 2:
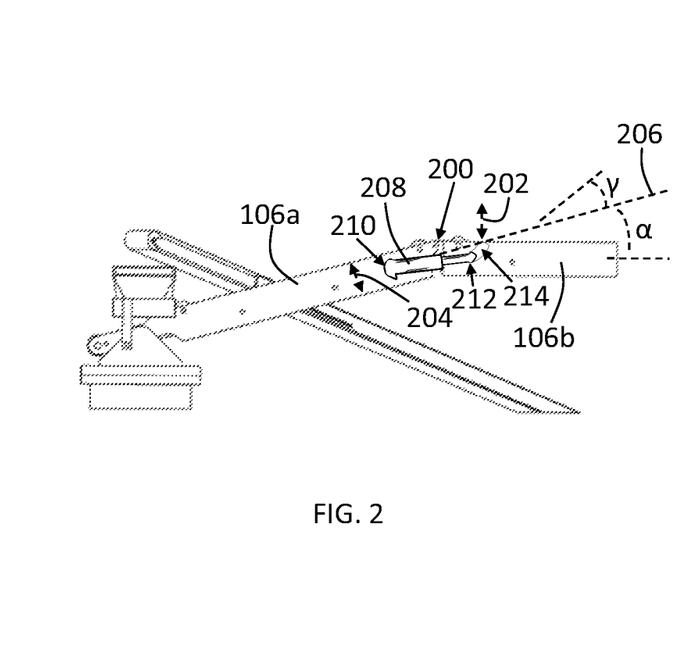
FIG. 2 is a close-up view of section 2-2 of the assembly of FIG. 1.
Figure 3:
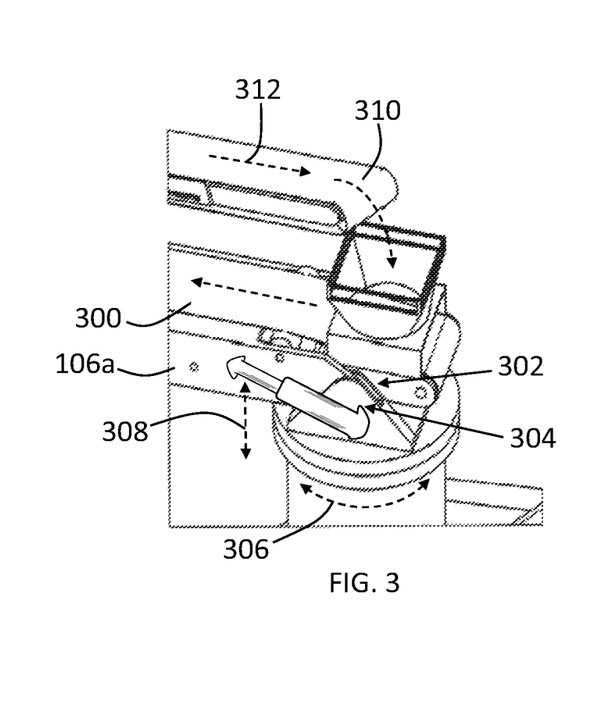
FIG. 3 is a partial downward looking perspective view of a feeder belt and the main boom section of FIG. 1.

With reference now to FIGS. 1-3 and to facilitate in accomplishing the advantageous maneuverability, the main conveyor boom assembly 102 includes a—with a first main conveyor belt 300 and a first end 302 rotatably coupled to a deck 108 of a vehicle 110 about a main conveyor base joint 304 so that the main conveyor boom assembly 102 may rotate as a single unit, if desired. In one embodiment, the main conveyor boom assembly 102 also includes an intermediate main conveyor boom section 106c and a second intermediate main conveyor boom section 106b interposed between the intermediate main conveyor boom section 106c and the proximal main conveyor boom section 106a. Other main boom sections 106a-n may also be utilized as intermediate main conveyor boom sections depending on the desired reach of the main conveyor boom assembly 102 and the spatial limitations associated with the length between one or more upper surfaces of the deck 108 of the vehicle 110 and a bottom surface 112 of the distal main conveyor boom section 106n when the main conveyor boom assembly 102 is placed in a storing position along a boom extension path. Said another way, the storing position is a configuration with the main boom sections 106a-n in an overlapping relationship with one another substantially along their respective lengths such that the main boom sections 106a-n can be transported. When the assembly 100 utilizes a feeder conveyor 104 mechanically coupled to the deck 108 of the vehicle 110, the storing position would also include the deck 108 having sufficient spatial capacity to receive the length of the feeder conveyor 104, i.e., as best shown in FIG. 4, from a proximal end 400 of the feeder conveyor 104 to a distal end 402 of the feeder conveyor 104.

In one embodiment, the proximal main conveyor boom section 106a may be pivotally coupled to the main conveyor base joint 304 and operably configured to rotate in a horizontal plane (wherein said rotation is represented by arrows 306) and in a vertical plane (wherein said rotation is represented by arrows 308). As discussed in the prior-art references cited in the Background section, this horizontal and vertical rotation may be accomplished by employing various electrical and mechanical components, e.g., actuators and motors, known by those of skill in the art to translate main boom sections. In one embodiment, the feeder conveyor 104 may be advantageously coupled to a deck joint 900 (shown best in FIG. 9) disposed at a distal end 902 of the deck 108 of the vehicle 110 so the assembly 100 can be utilized with minimal time and costs attributed to the user, and stored with minimal effort from the user. The feeder assembly 104 may be maneuvered into place manually or with the use of actuators and/or motors. The use of the term "end" (whether distal, proximal, or otherwise) does not indicate the referencing object's terminal end, unless specifically specified; rather, it means a location or area at or adjacent to the object's terminal end, i.e., within 5% of the objects overall length. In other embodiments, the feeder conveyor 104 may be employed by a user without it being coupled to the vehicle 110 or with it being coupled in another location on the vehicle 110.

Figure 4:
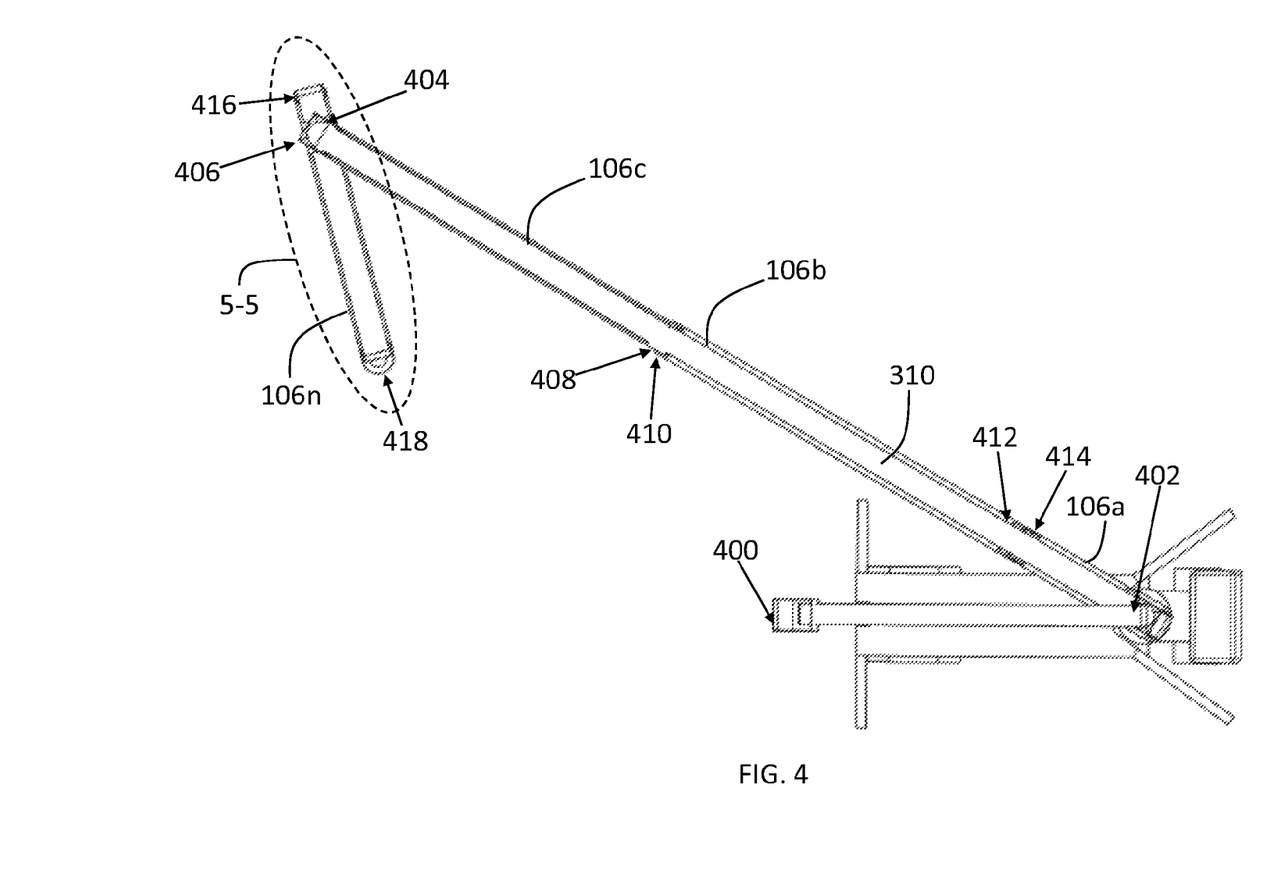
FIG. 4 is a top plan view of the assembly of FIG. 1.
Figure 9:
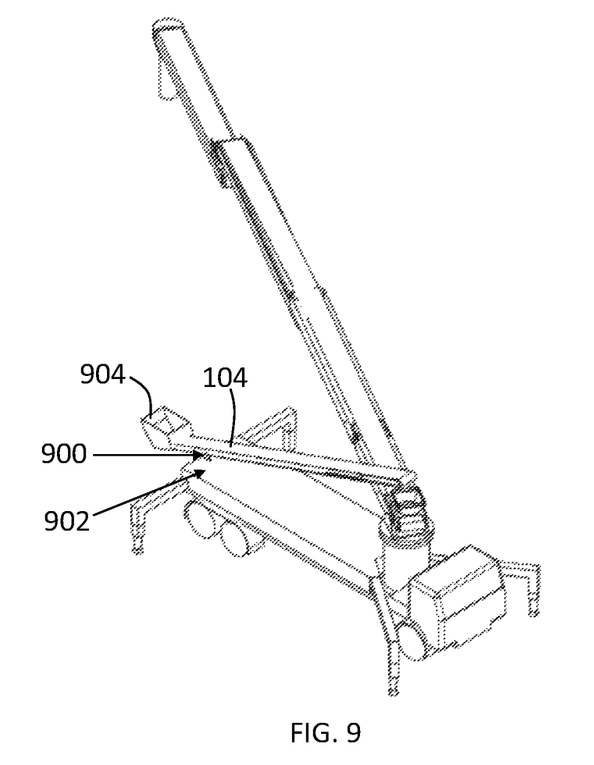
FIG. 9 is a downward-looking perspective view of the assembly of FIG. 8.

With reference to FIGS. 3, 4, and 9, the feeder conveyor 104 is preferably pivotably coupled to the deck pivot joint 900 such that the pivot joint 900 acts a fulcrum and permits the feeder conveyor 104 to be placed in various positions. The feeder conveyor 104 may also include a hopper 904 with a lower end disposed at the proximal or first end 400 of the feeder conveyor 104. The feeder conveyor 104 is operably configured to transport the construction material from the hopper 904 toward the distal end 402 of the feeder conveyor 104 via, for example, a belt 310. The feeder conveyor 104 may also include an operational position along a feeder conveyor placement path, wherein the operational position includes the distal end 402 of the feeder conveyor 104 in a superimposed configuration with respect to the first end 302 of the proximal main conveyor boom section 106a and the first main conveyor belt 300, as best shown in FIG. 3. The proximal main conveyor boom section 106a may also have a hopper for receiving the construction material and relaying the construction material to the main conveyor belt 300. The flow direction of the construction material can be shown in FIG. 3 with the arrows 312.

With reference to FIGS. 4-8, the boom assembly 100 includes a distal main conveyor boom section 106n that is rotatably coupled to one of the plurality of main conveyor boom sections 106a-n about a revolution joint 404, and that is supported a distance 114 above a ground surface 116 by the vehicle 110. In one embodiment, the distal main conveyor boom section 106n is rotatably and directly coupled to the intermediate main conveyor boom section 106c. The direct coupling connection, through the revolution joint, may be at the second end 406 of the intermediate main conveyor boom section 106c. In other embodiments, should additional or less booms sections be desired, the distal main conveyor boom section 106n may be rotatably and directly coupled to another intermediate section disposed at the sequential end of the boom sections. The intermediate main conveyor boom section 106c includes a first end 408 translatably coupled to the proximal main conveyor boom section 106a. Similarly, the second intermediate main conveyor boom section 106b may also include a first end 412 translatably coupled to the proximal main conveyor boom section 106a. The second intermediate main conveyor boom section 106b also includes a second end 410 in which the intermediate main conveyor boom section 106c translates with respect to. The second intermediate main conveyor boom section 106b also includes a first end 414 that may be translatably coupled, e.g., rotated and/or pivoted, with respect to second end 414 of the proximal main conveyor boom section 106a. In one embodiment, the revolution joint 404 is disposed at the first end 416 of the distal main conveyor boom section 106n, while in other embodiments, it may be disposed in other locations along a length of the distal main conveyor boom section 106n.

With specific reference briefly to FIGS. 2 and 4, in one embodiment, the proximal main conveyor boom section 106a is directly and pivotably coupled with respect to the second intermediate main conveyor boom section 106b about a pivot joint 200 disposed, for example, proximal to the top surface of the frames of the proximal and second intermediate main conveyor boom sections 106a-b. In one embodiment, the two main conveyor boom sections 106a-b are rotatably coupled together with a rod/pin—acting as a fulcrum, wherein the second intermediate main conveyor boom section 106b is operably configured to pivot in a vertical direction (or in the y-axis—represented with arrow 202) with respect to the proximal main conveyor boom sections 106a. The rod/pin extends from one side surface of the frame to the other side surface. To accommodate such movement, the distal end 414 of the proximal main conveyor boom section 106a, or the proximal end 412 of the second intermediate main conveyor boom section 106b, tapers in thickness (represented with arrow 204) as it spans towards the distal end 414 to accommodate negative angular movement, a, relative to the generally planar axis 206 defined by the generally longitudinal orientation of the proximal main conveyor boom section 106a. In one embodiment, the second intermediate main conveyor boom section 106b has a negative angular deviation ranging from approximately 40-45°. The second intermediate main conveyor boom section 106b may also have positive angular deviation, γ, ranging from approximately 20-25°. Other potential ranges, however, may be utilized. As such, the main conveyor boom sections 106b-n may be adjusted vertically about the pivot joint 200 to accommodate various structural roadblocks present at many construction or job sites and/or to effectively and efficiently reach the concrete placement location without adjusting the feeder assembly 104 or the proximal main conveyor boom section 106a.

To move the main conveyor boom sections 106b-n about the pivot joint 200, the assembly 100 may utilize one or more mechanical drivers, such as pneumatic, electrical, thermal, magnetic, mechanical, or hydraulic actuators, e.g., driver/actuator 208. In one embodiment, the base 210 of the actuator 208 may be mechanically coupled (e.g., utilizing one or more fasteners) to the second end 414 of the proximal main conveyor boom section 106a and operably configured to rotate, for example on ball bearings, within a housing and the distal end 212 of the actuator 208 may be operably configured to extend and retract within a track 214 sized to receive the distal end 212 of the actuator 208 and shaped to permit the distal end 212 to translate and vertically adjust the adjacently coupled main conveyor boom section. In other embodiments, the assembly 100 may utilize another type of mechanical driver, e.g., a cable/pulley configuration, in order to provide the necessary force to rotate the second intermediate main conveyor boom section 106b with respect to the proximal main conveyor boom section 106a.

With reference back to FIGS. 4-8, in one embodiment, the translation is telescopic translation in the longitudinal direction, as known by those of skill in the art. In other embodiments, the translation may also include pivoting or other vertical adjusting of the boom sections and/or a combination of telescopic translation and pivoting or vertical adjustment. Referring briefly back to FIG. 1 in combination with FIG. 4, in one embodiment two or more main boom sections are telescopically coupled together such that they extend and retract in a "closed-stacked" relationship. Specifically, two main boom sections, e.g., 106b-c, may be coupled together through, for example, a tongue-and-groove or roller/wheel-track configuration, wherein one or both of the two main boom sections 106b-c are operable to telescopically translate in a longitudinal direction with respect to one another. Further, as seen depicted in FIG. 1, the two main boom sections 106b-c are stacked on top of one another, which provides greater structural rigidity and support while one of the two main boom sections 106b-c is translating to the desired position. Tensioning of the main conveyor belt 300 through boom section translation may occur with known techniques and using known components, such as those described in the references cited in the Background section and, for example, in U.S. Pat. No. 7,108,125 (Gilmore et al.) (wherein the entirety of said reference is incorporated herein by reference). Therefore, in one embodiment, the main conveyor belt 300 is beneficially a single belt that revolves around the main boom sections 106a-c using, for example, rollers and motors. Said another way, the belts 300 may be described as being revolvably coupled to the respective boom sections 106a-c. In other embodiments, the main conveyor belt 300 is composed of a plurality of belts independently revolving around their respective one or more main boom sections 106a-c.

With reference briefly to FIGS. 2-4, the main conveyor boom sections 106a-n may also have "structurally closed frames." The boom sections 106a-n are considered to have structurally closed frames such that they substantially no openings along their respective lengths aside from those used to permit the revolution of the rollers or movement of any other components, e.g., actuators, used to maneuver the main conveyor boom sections 106a-n. These structurally closed frames advantageously create a more structurally rigid and secure main conveyor boom assembly.

With reference back to FIGS. 4-8, the distal main conveyor boom section 106n includes a second main conveyor belt 500 spanning from a first end 416 of the distal main conveyor boom section 106n to a second end 418 of the distal main conveyor boom section 106n. The second main conveyor belt 500 independently revolves around the distal main conveyor boom section 106n, as the distal main conveyor boom section 106n, more particularly the second end 418, is operably configured to independently revolve, approximately 360°, about the revolution joint 404. The first and second main conveyor belts 300, 500 are operably configured to transport the construction material toward the second end 418 of the distal main conveyor boom section 106n, where it may pass through an end hose 502 and ultimately placed in the desired location by the user. The construction material directional flow from the intermediate main conveyor boom section 106c, to the distal main conveyor boom section 106n, and then through the end hose 502 can be seen depicted with arrows 504 in FIG. 5.

Figure 5:
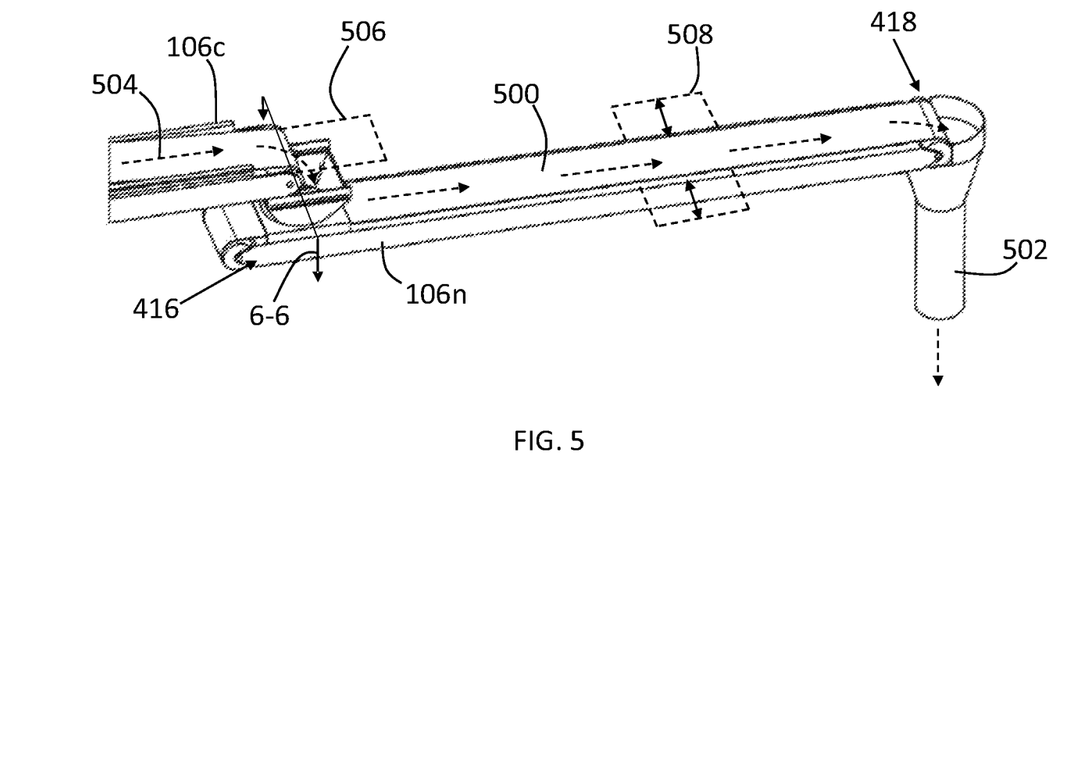
FIG. 5 is a close-up fragmentary view of section 5-5 of the assembly in FIG. 1 with a distal main boom of the main conveyor disposed in a generally longitudinal orientation in accordance with one embodiment of the present invention.
Figure 6:
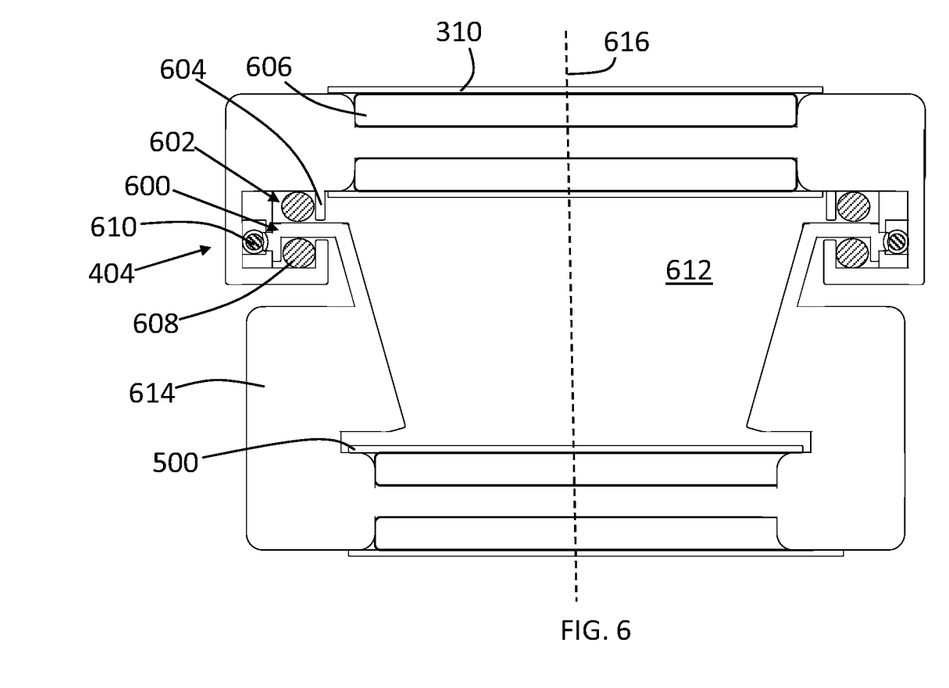
FIG. 6 is a fragmentary cross-sectional view of the assembly in FIG. 5 about section line 6-6.
Figure 7:
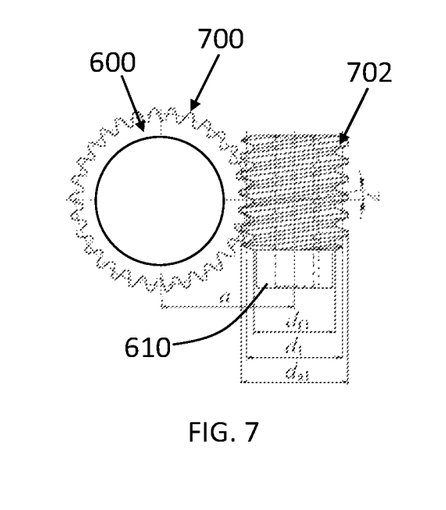
FIG. 7 is a fragmentary view of an exemplary worm gear configuration used to revolve the distal main boom section.
Figure 8:
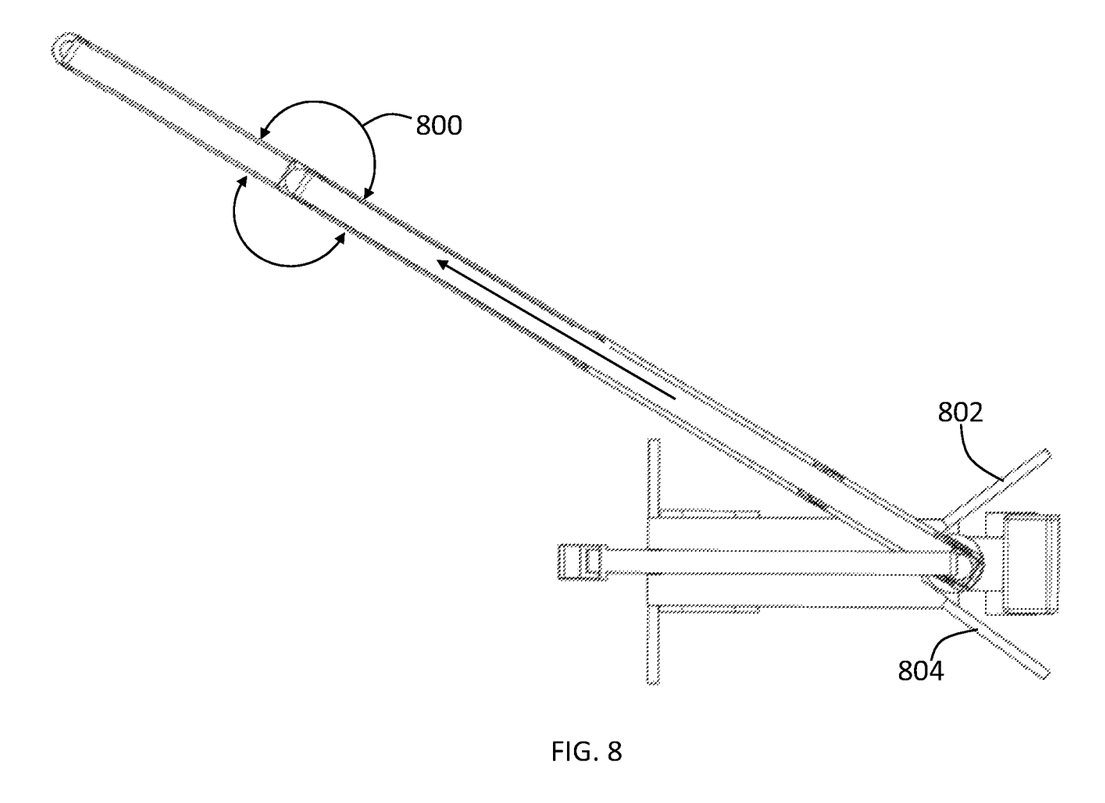
FIG. 8 is a top plan view of the conveyor assembly with a distal main boom of the main conveyor disposed in a generally longitudinal orientation in accordance with one embodiment of the present invention.

The distal main conveyor boom section 106n is operable to rotate approximately 360° (i.e., with 5°) using, for example, a coupling configuration best shown in FIG. 6. FIG. 6 depicts a cross-section view of the revolution joint 404 about section line 6-6 depicted in FIG. 5. An exemplary rotation path of the distal main conveyor boom section 106n is depicted in FIG. 8 with arrows 800. Specifically, the first end 416 of the distal main conveyor boom section 106n may have an upper annual portion 600 with teeth 700 surrounding a perimeter of the annual portion 600. The teeth 700 may be coupled to a drive axle 610 also having teeth 702 corresponding to the teeth of the annual portion 600. FIG. 7 depicts a top plan view of an exemplary axial module worm gear pair. In other embodiments, the distal main conveyor boom section 106n may revolve about the revolution joint 404 using a tongue-and-groove configuration or a cable/pully configuration. The annual portion 600 may have an upper portion that seats within a channel 602 defined by a lower end of the second end 406, specifically a frame member 604, of the intermediate main conveyor boom section 106c. As those of skill in the art will appreciate, the frame member 604 of the intermediate main conveyor boom section 106c flanks the first main conveyor belt 300 so that it can revolve about the respective boom sections and rollers, e.g., roller 606, disposed thereon. Said another way, the first main conveyor belt 300 may span from the from the first end 302 of the proximal main conveyor boom section 106a to a second end 416 of the intermediate main conveyor boom section 106c, wherein the first main conveyor belt 300 is operably configured to revolve around the proximal main conveyor boom section 106a, the intermediate main conveyor boom section 106c, and the second intermediate main conveyor boom section 106b. The axial module worm gear pair may have various root diameters, $d_{f1}$, reference diameters, $d_1$, tip diameters, $d_{a1}$, center distances, $\alpha$, and lead angles, $\gamma$, depending on the design constraints and parameters.

The rotation of the distal main conveyor boom section 106n may also be described or limited in terms of its axis or plane of rotation. For example, the first main conveyor belt 300 disposed on the intermediate main conveyor boom section 106c may define a belt plane (represented with numeral 506 in FIG. 5). The distal main conveyor boom section 106n may revolve about an axis of revolution (represented with numeral 616 in FIG. 6) defined by the center of rotation of the distal main conveyor boom section 106n about the revolution joint 404. The rotation of the distal main conveyor boom section 106n may then be described by the axis of revolution 616 being disposed at an approximately orthogonal orientation (i.e., 90°+/−5°) with respect to the belt plane 506. Alternatively, the rotation of the distal main conveyor boom section 106n may be described as generating a distal main conveyor boom section rotation plane (represented with numeral 508 in FIG. 5) that is substantially parallel to, yet non-co-planar with, the belt plane 506.

When the user desires to rotate the distal main conveyor boom section 106n, in one embodiment, the distal main conveyor boom section 106n may be operable for it to be manually maneuvered to the desired position. In such an embodiment, the axial module worm gear pair may be omitted, and the distal main conveyor boom section 106n would be supported by and operable to rotate through the use of one more ball bearings 608. The distal main conveyor boom section 106n would also have a manual or electronic locking member that would be operably configured to prohibit rotation of the distal main conveyor boom section 106n when desired. In other embodiments, the axial module worm gear pair or other driving mechanisms and configurations may be rotated using, for example, a motor, driver, and/or gear box that may have various designs and outputs, including torque and velocity, depending on the design constraints and parameters.

As such, the multi-sectioned boom concrete conveyor assembly 100 is operable to transport concrete to a placement location in a continuous fashion, while simultaneously providing the user the ability to maneuver the end hose 502 to the desired location for effective and efficient placement of the construction material, e.g., dirt, concrete, or other material, e.g., wheat/corn. Specifically, as shown in FIGS. 5-6, the construction material would transport through the intermediate main conveyor boom section 106c via the first main conveyor belt 300, through a joint aperture 612 defined by a portion of the frame 614 of the distal main conveyor boom section 106n, and then onto the second main conveyor belt 500 where it is ultimately transported to the end hose 502 and placement location desired by the user.

Figure 10:
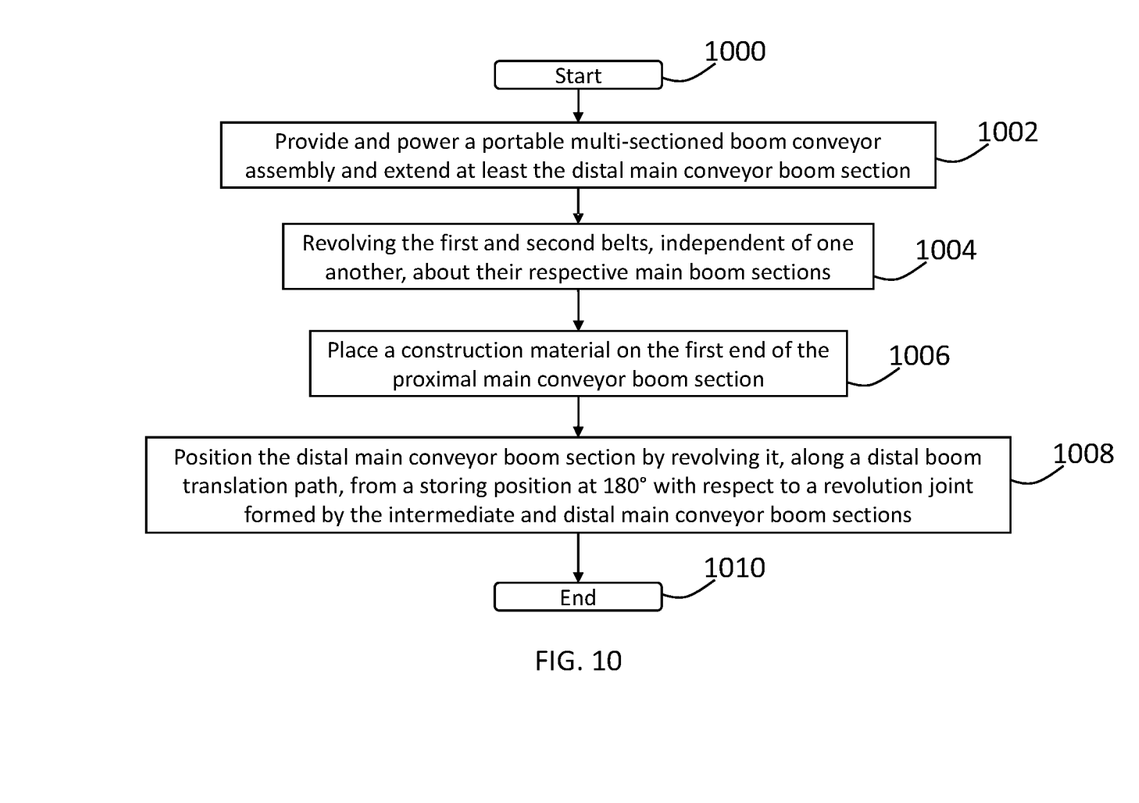
FIG. 10 is a process-flow diagram depicting an exemplary method of placing a construction material.

With reference to FIG. 10, a process flow diagram is depicted that represents one exemplary and beneficial method of placing concrete. Although FIG. 10 shows a specific order of executing the process steps, the order of executing the steps may be changed relative to the order shown in certain embodiments. Also, two or more blocks shown in succession may be executed concurrently or with partial concurrence in some embodiments. Certain steps may also be omitted in FIG. 10 for the sake of brevity. In some embodiments, some or all of the process steps included in FIG. 10 can be combined into a single process. The process begins at step 1000 and immediately proceeds to step 1002 of providing and powering the assembly and extending at least the distal main conveyor boom section 106n to a desired length. Before extending the distal main conveyor boom section 106n, those of skill in the art will appreciate that other steps may be taken before such action, e.g., installing and/or positioning one or more outriggers 802, 804, which are depicted in at least FIG. 8. In one embodiment, the overall length of the plurality of main boom sections 106a-n may range from 50-200 feet. Each of the plurality of main boom sections 106a-n may be approximately 30-50 feet in length, while the width of each section (from frame-to-frame flanking the belt) may range from 2-6 feet. Each of the plurality of main boom sections 106a-n may also have a height (from upper belt surface-to-lower belt surface) range from approximately 1-6 feet.

Next, the process continues to step 1004 of revolving the first and second belts 300, 500 around their respective main boom sections. Said another way, the assembly 100 may provide power to one or more motors operably configured to revolve the belts 300, 500 around the respective boom sections 106a-n. When a belt is disposed on the upper side or above of one of the boom sections 106a-n, it is described as an upper belt surface, as opposed to when the belt is disposed underneath one of the booms sections 106a-n, it is described as a lower-belt surface. Should the assembly 100 be used in combination with a feeder conveyor 104, the user would also start revolving the feeder conveyor belt 310 as well. Next, the process continues to step 1006 of placing a construction material, e.g., concrete, on the first end 302 of the proximal main conveyor section 106a, or the hopper and/or first end 400 of the feeder conveyor 104, wherein the construction material is transported across the first and second main conveyor belts 300, 500.

Next, the process continues to the step 1008 of positioning the distal main conveyor boom section 106n by revolving it, along a distal boom translation path, from a storing or initial position at least 180° with respect to the revolution joint 404 formed by the intermediate main conveyor boom section 106c and distal main conveyor boom section 106n. This step may also include revolving the second end 418 of the distal main conveyor boom section 106n approximately 360° with respect to the revolution joint 404. After the distal main conveyor boom section 106n has been rotated or revolved, it is said to be in a placement position on the distal boom translation path where the construction material can flow from an end hose 502 or otherwise be placed by the operator/user in its desired location. As such, the assembly 100 is able to provide effective and efficient placement of the construction material and an assembly that beneficially has additional and various degrees of freedom when compared to known construction material placement assemblies. The process may then continue to revolving or retracting the main boom sections such that they are placed back in their initial or storing position and operable to be transported by a vehicle to various locations for subsequent use. The process may then terminate at step 1010.

What is claimed is:

1. A portable multi-sectioned boom concrete conveyor assembly comprising:
   a feeder conveyor with a belt operably configured to transport a construction material toward a distal end of the feeder conveyor;
   a main conveyor boom assembly including a plurality of main conveyor boom sections, the plurality of main conveyor boom sections having:
      a proximal main conveyor boom section with a first main conveyor belt and a first end rotatably coupled to a deck of a vehicle about a main conveyor base joint; and
      a distal main conveyor boom section:
         supported a distance above a ground surface by the vehicle;
         rotatably coupled to one of the plurality of main conveyor boom sections about a revolution joint;
         with a second main conveyor belt spanning from a first end of the distal main conveyor boom section to a second end of the distal main conveyor boom section; and
         operably configured to independently revolve approximately 360° about the revolution joint, wherein
   the first and second main conveyor belts are operably configured to transport the construction material toward the second end of the distal main conveyor boom section.

2. The portable multi-sectioned boom concrete conveyor assembly according to claim 1, wherein:
   the revolution joint is disposed at the first end of the distal main conveyor boom section.

3. The portable multi-sectioned boom concrete conveyor assembly according to claim 1, wherein the plurality of main conveyor boom sections further comprise:
   an intermediate main conveyor boom section with a first end translatably coupled to the proximal main conveyor boom section, the distal main conveyor boom section rotatably and directly coupled to the intermediate main conveyor boom section about the revolution joint.

4. The portable multi-sectioned boom concrete conveyor assembly according to claim 3, further comprising:
a belt plane defined by the first main conveyor belt while disposed on an upper surface of the intermediate main conveyor boom section; and
an axis of revolution defined by a center of rotation of the distal main conveyor boom section about the revolution joint, the axis of revolution disposed at an approximately orthogonal orientation with respect to the belt plane.

5. The portable multi-sectioned boom concrete conveyor assembly according to claim 3, wherein the plurality of main conveyor boom sections further comprise:
a second intermediate main conveyor boom section with a first end pivotally and directly coupled to the proximal main conveyor boom section and a second end translatably coupled to the intermediate main conveyor boom section, the second intermediate main conveyor boom section interposed between the intermediate main conveyor boom section and the proximal main conveyor boom section.

6. The portable multi-sectioned boom concrete conveyor assembly according to claim 5, wherein:
the first main conveyor belt spans from the from the first end of the proximal main conveyor boom section to a second end of the intermediate main conveyor boom section, the first main conveyor belt operably configured to revolve around the proximal main conveyor boom section, the intermediate main conveyor boom section, and the second intermediate main conveyor boom section.

7. The portable multi-sectioned boom concrete conveyor assembly according to claim 6, wherein:
the proximal main conveyor boom section, the intermediate main conveyor boom section, and the second intermediate main conveyor boom section are structurally closed frames.

8. The portable multi-sectioned boom concrete conveyor assembly according to claim 1, further comprising:
a deck pivot joint disposed at a distal end of the deck of the vehicle, wherein the feeder conveyor it pivotably coupled to the deck pivot joint.

9. The portable multi-sectioned boom concrete conveyor assembly according to claim 8, wherein the feeder conveyor further comprises:
a hopper coupled to a proximal end of the feeder conveyor, wherein the feeder conveyor is operably configured to transport the construction material from the hopper toward the distal end of the feeder conveyor.

10. The portable multi-sectioned boom concrete conveyor assembly according to claim 9, wherein the feeder conveyor further comprises:
an operational position along a feeder conveyor placement path, wherein the operational position includes the distal end of the feeder conveyor in a superimposed configuration with respect to the first end of the proximal main conveyor boom section and the first main conveyor belt.

11. A portable multi-sectioned boom concrete conveyor assembly comprising:
a main conveyor boom assembly including a plurality of main conveyor boom sections, the plurality of main conveyor boom sections having:
a proximal main conveyor boom section with a first main conveyor belt revolvably coupled thereto and a first end rotatably coupled to a deck of a vehicle about a main conveyor base joint;
an intermediate main conveyor boom section translatably coupled to the proximal main conveyor boom section and having the first main conveyor belt revolvably coupled thereto; and
a distal main conveyor boom section:
supported a distance above a ground surface by the vehicle;
rotatably coupled to the intermediate main conveyor boom section about a revolution joint disposed at a first end of the distal main conveyor boom section;
with a second main conveyor belt, independent of the first main conveyor belt, revolvably coupled thereto and spanning from the first end of the distal main conveyor boom section to a second end of the distal main conveyor boom section; and
operably configured to independently revolve approximately 360° about the revolution joint, wherein
the first and second main conveyor belts operably configured to transport a construction material toward the second end of the distal main conveyor boom section.

12. The portable multi-sectioned boom concrete conveyor assembly according to claim 11, further comprising:
a feeder conveyor with a belt operably configured to transport the construction material toward a distal end of the feeder conveyor.

13. The portable multi-sectioned boom concrete conveyor assembly according to claim 12, further comprising:
a deck pivot joint disposed at a distal end of the deck of the vehicle, wherein the feeder conveyor it pivotably coupled to the deck pivot joint.

14. The portable multi-sectioned boom concrete conveyor assembly according to claim 13, wherein the feeder conveyor further comprises:
an operational position along a feeder conveyor placement path, wherein the operational position includes the distal end of the feeder conveyor in a superimposed configuration with respect to the first end of the proximal main conveyor boom section and the first main conveyor belt.

15. The portable multi-sectioned boom concrete conveyor assembly according to claim 11, further comprising:
a belt plane defined by the first main conveyor belt while disposed on an upper surface of the intermediate main conveyor boom section; and
an axis of revolution defined by a center of rotation of the distal main conveyor boom section about the revolution joint, the axis of revolution disposed at an approximately orthogonal orientation with respect to the belt plane.

16. The portable multi-sectioned boom concrete conveyor assembly according to claim 11, wherein the plurality of main conveyor boom sections further comprise:
a second intermediate main conveyor boom section with a first end pivotally and directly coupled to the proximal main conveyor boom section and a second end translatably coupled to the intermediate main conveyor boom section, the second intermediate main conveyor boom section interposed between the intermediate main conveyor boom section and the proximal main conveyor boom section.

17. A portable multi-sectioned boom concrete conveyor assembly comprising:
a main conveyor boom assembly including a plurality of main conveyor boom sections, the plurality of main conveyor boom sections having:

a proximal main conveyor boom section with a first main conveyor belt revolvably coupled thereto and a first end rotatably coupled to a deck of a vehicle about a main conveyor base joint;

a mechanical driver mechanically coupled to a second end of the proximal main conveyor boom section;

an intermediate main conveyor boom section directly and pivotably coupled to a second end of the proximal main conveyor boom section about a pivot joint and having the first main conveyor belt revolvably coupled thereto, the intermediate main conveyor boom section operably configured, through the mechanical driver, to rotatably and vertically pivot with respect to the second end of the proximal main conveyor boom section; and a distal main conveyor boom section:
  supported a distance above a ground surface by the vehicle; and
  rotatably coupled to the intermediate main conveyor boom section about a revolution joint disposed at a first end of the distal main conveyor boom section.

18. The portable multi-sectioned boom concrete conveyor assembly according to claim 17, wherein:

the intermediate main conveyor boom section is operably configured, through the mechanical driver, to rotatably and vertically pivot with respect to the second end of the proximal main conveyor boom section a negative angular deviation of at least 25° relative to a planar axis defined by the generally longitudinal orientation of the proximal main conveyor boom section.

19. The portable multi-sectioned boom concrete conveyor assembly according to claim 17, wherein:

the proximal main conveyor boom section tapers in thickness as it spans towards the second end of the proximal main conveyor boom section.

20. The portable multi-sectioned boom concrete conveyor assembly according to claim 17, wherein the distal main conveyor boom section further comprises:

a second main conveyor belt, independent of the first main conveyor belt, revolvably coupled thereto and spanning from the first end of the distal main conveyor boom section to a second end of the distal main conveyor boom section; wherein the distal main conveyor boom section is operably configured to independently revolve approximately 360° about the revolution joint.

* * * * *